US012670386B2

(12) United States Patent
Chu

(10) Patent No.: US 12,670,386 B2
(45) Date of Patent: Jun. 30, 2026

(54) APPARATUS, METHOD, AND COMPUTER-READABLE MEDIUM OF TRAINING ABNORMAL DETECTING MODEL

(71) Applicant: PEGATRON CORPORATION, Taipei City (TW)

(72) Inventor: Shih-Jen Chu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 1100 days.

(21) Appl. No.: 17/669,050

(22) Filed: Feb. 10, 2022

(65) Prior Publication Data

US 2022/0327381 A1     Oct. 13, 2022

(30) Foreign Application Priority Data

Apr. 8, 2021   (TW) ................................. 110112661

(51) Int. Cl.
| *G06N 3/08* | (2023.01) |
| *G06F 18/21* | (2023.01) |
| *G06F 18/214* | (2023.01) |
| *G06N 3/04* | (2023.01) |

(52) U.S. Cl.
CPC ............. *G06N 3/08* (2013.01); *G06F 18/214* (2023.01); *G06F 18/217* (2023.01); *G06N 3/04* (2013.01)

(58) Field of Classification Search
CPC .......... G06N 3/08; G06N 3/04; G06F 18/217; G06F 18/214
See application file for complete search history.

(56) References Cited

U.S. PATENT DOCUMENTS

| 2019/0130279 A1 | 5/2019 | Beggel et al. |
| 2019/0295302 A1 | 9/2019 | Fu et al. |
| 2020/0176004 A1* | 6/2020 | Kleijn ..................... G10L 19/00 |
| 2020/0233920 A1* | 7/2020 | Meeds ................... G06N 3/047 |
| 2021/0034968 A1 | 2/2021 | Kim et al. |

FOREIGN PATENT DOCUMENTS

| CN | 111709491 | 9/2020 |
| CN | 112148955 A | 12/2020 |

OTHER PUBLICATIONS

Yamanaka, Yuri et al. "Autoencoding Binary Classifiers or Supervised Anomaly Detection", Aug. 23, 2019, PRICAI 2019: Trends in Artificial Intelligence, pp. 647-659 (Year: 2019).*
Lubbering, Max et al., "From Imbalanced Classification to Supervised Outlier Detection Problems: Adversarially Trained Auto Encoders", Oct. 14, 2020, Artificial Neural Networks and Machine Learning—ICANN 2020, pp. 27-38 (Year: 2020).*
"Office Action of India Counterpart Application", issued on May 5, 2025, p. 1-p. 6.

* cited by examiner

*Primary Examiner* — Haimei Jiang
*Assistant Examiner* — Thomas Bernard Lane
(74) *Attorney, Agent, or Firm* — J.C. PATENTS

(57)          ABSTRACT

A model training apparatus, a model training method, and a computer-readable medium are provided. In the method, a labeled abnormal sample is inputted into an abnormal detecting model. The abnormal detecting model is based on an autoencoder structure. A reconstructed error between the abnormal sample and an output of the abnormal detecting model is maximized to optimize the abnormal detecting model.

9 Claims, 4 Drawing Sheets

APPARATUS, METHOD, AND COMPUTER-READABLE MEDIUM OF TRAINING ABNORMAL DETECTING MODEL

CROSS-REFERENCE TO RELATED APPLICATION

This application claims the priority benefit of Taiwan application serial no. 110112661, filed on Apr. 8, 2021. The entirety of the above-mentioned patent application is hereby incorporated by reference herein and made a part of this specification.

BACKGROUND

Technical Field

The disclosure relates to a machine learning technique, and particularly relates to a model training apparatus, a model training method, and a computer-readable medium.

Description of Related Art

Machine learning algorithms may make predictions about unknown data by analyzing large amounts of data to infer the laws of these data. In recent years, machine learning has been widely used in fields such as image recognition, natural language processing, medical diagnosis, error detection, or speech recognition. In particular, as a branch of the machine learning field, Artificial Neural Network (ANN) has also developed rapidly in recent years, and has gradually achieved expected effects in various fields.

It is worth noting that, for abnormal detection, an autoencoder is a common ANN and may perform abnormal detection based on reconstructed error. FIG. 1A is a schematic diagram of an existing autoencoder-training phase. Referring to FIG. 1A, during the training phase of the abnormal detecting model, an original input OI regarded as a normal sample is encoded by an encoder E into a compressed representation CR, and then decoded by a decoder D into a reconstructed input RI. Generally speaking, the training phase is for the abnormal detecting model to learn how to reconstruct a normal sample. For example, the smaller a reconstructed error Er1, the smaller the error after the reconstruction of the normal sample. However, since the abnormal detecting model does not learn how to reconstruct an abnormal sample, the reconstructed error after an abnormal sample is reconstructed may be greater than the error of reconstructing a normal sample, thus causing misjudgment. FIG. 1B is a schematic diagram of an existing autoencoder-test phase. Referring to FIG. 1B, in the test phase, an original input OI2 regarded as an abnormal sample is encoded by the encoder E into a compressed representation CR2, and then decoded by the decoder D into a reconstructed input RI2. At this point, an expected reconstructed error Er2 should be greater than a threshold value TH or even significantly greater than the reconstructed error Er1, but as shown in FIG. 1B, a reconstructed error Er3 may be less than or close to the reconstructed error Er1.

SUMMARY

In view of this, the embodiments of the disclosure provide a model training apparatus, a model training method, and a computer-readable medium that may alleviate the misjudgment situation of an abnormal sample.

A model training method of an embodiment of the disclosure includes the following steps. A labelled abnormal sample is input into an abnormal detecting model. The abnormal detecting model is based on an autoencoder structure. A reconstructed error between an output of the abnormal sample via the abnormal detecting model and the abnormal sample is maximized to optimize the abnormal detecting model.

A model training apparatus of an embodiment of the disclosure includes a storage and a processor. The storage stores a program code. The processor is coupled to the storage. The processor loads and executes the program code to be configured to input a labeled abnormal sample to an abnormal detecting model and to maximize a reconstructed error between an output of the abnormal sample via the abnormal detecting model and the abnormal sample to optimize the abnormal detecting model. The abnormal detecting model is based on an autoencoder structure.

In a computer-readable medium of an embodiment of the disclosure, a program code is loaded via a processor to execute the following steps. A labeled abnormal sample is input into an abnormal detecting model. The abnormal detecting model is based on an autoencoder structure. A reconstructed error between an output of the abnormal sample via the abnormal detecting model and the abnormal sample is maximized to optimize the abnormal detecting model.

Based on the above, according to the model training apparatus, the model training method, and the computer-readable medium according to the embodiments of the disclosure, the reconstructed error of the reconstruction of an abnormal sample is maximized, and the abnormal detecting model configured for reconstruction is optimized accordingly. In this way, the result of the reconstruction of the abnormal sample may be prevented from being too close to the original input, thereby reducing the occurrence of misjudgment.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
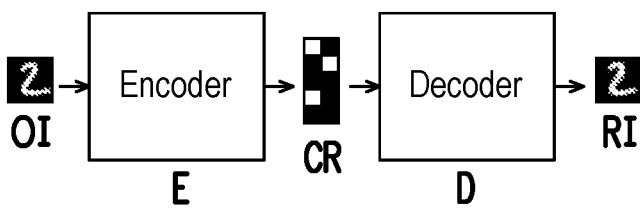
FIG. 1A is a schematic diagram of an existing autoencoder-training phase.
Figure 1B:
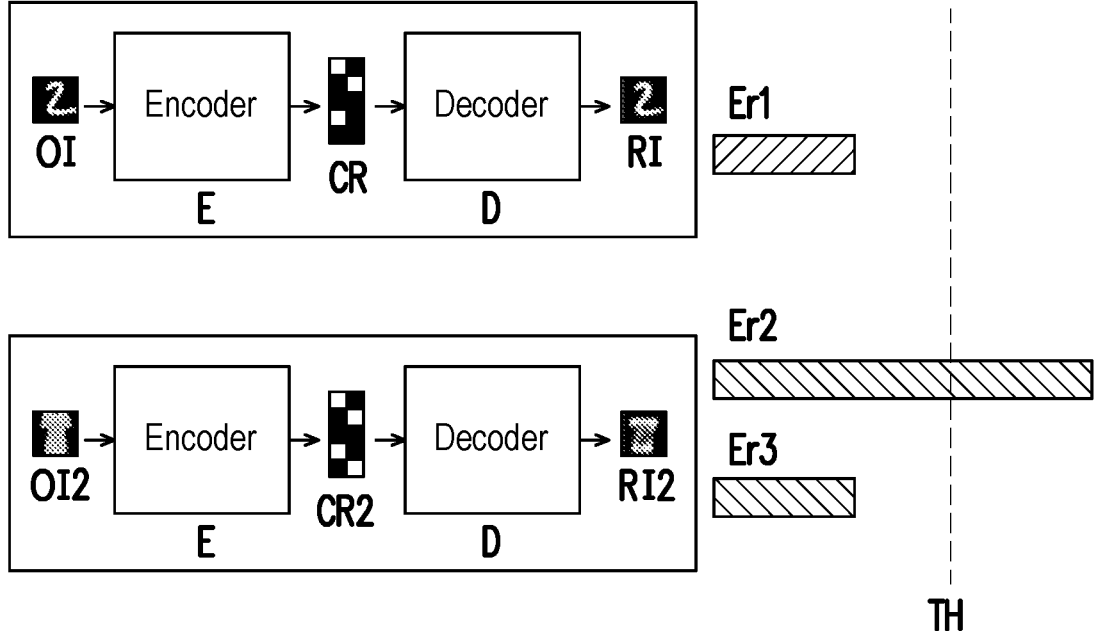
FIG. 1B is a schematic diagram of an existing autoencoder-test phase.
Figure 2:
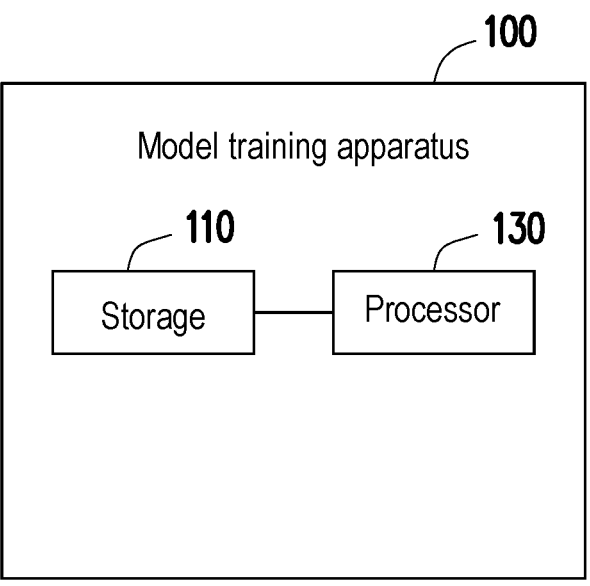
FIG. 2 is a block diagram of devices of an abnormal update apparatus according to an embodiment of the disclosure.

FIG. 2 is a block diagram of devices of a model training apparatus 100 according to an embodiment of the disclosure.

Please refer to FIG. 2, the model training apparatus 100 includes a storage 110 and a processor 130. The model training apparatus 100 may be a desktop computer, a notebook computer, a smart phone, a tablet computer, a server, an image recognition device, a medical testing instrument, an optical testing instrument, or other computing apparatuses.

The storage 110 may be any form of a fixed or movable random-access memory (RAM), read-only memory (ROM), flash memory, traditional hard-disk drive (HDD), solid-state drive (SSD), or similar devices. In an embodiment, the memory 110 is configured to record program codes, software modules, configurations, data (for example, samples, reconstructed results, neural network architecture related parameters, reconstructed errors, etc.) or other files, and embodiments thereof are described in detail later.

The processor 130 is coupled to the storage 110, and the processor 130 may be a central processing unit (CPU), a graphics processing unit (GPU), or other programmable general-purpose or special-purpose microprocessors, digital signal processors (DSPs), programmable controllers, field-programmable gate arrays (FPGAs), application-specific integrated circuits (ASICs), neural network accelerators, or other similar devices or a combination of the above devices. In an embodiment, the processor 130 is configured to perform all or part of the operations of the model training apparatus 100, and may load and execute program codes, software modules, files, and data recorded in the memory 110.

Hereinafter, the method described in an embodiment of the disclosure is described with various apparatuses, devices, and/or modules in the model training apparatus 100. Each of the processes of the present method may be adjusted according to embodiment conditions and is not limited thereto.

Figure 3:
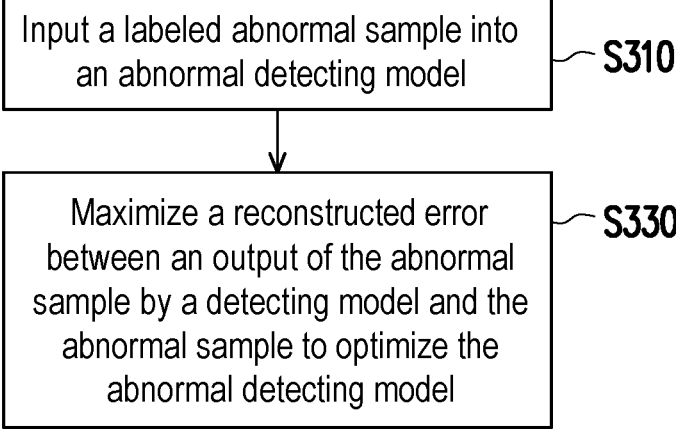
FIG. 3 is a flowchart of an abnormal update method according to an embodiment of the disclosure.

FIG. 3 is a flowchart of a model training method according to an embodiment of the disclosure. Referring to FIG. 3, the processor 130 inputs a labeled abnormal sample into an abnormal detecting model (step S310). Specifically, the abnormal detecting model is based on an autoencoder architecture, a learning architecture composed of an encoder and a decoder, or other neural network architectures configured to reconstruct a normal sample or other specified samples. Moreover, an abnormal sample is different from a normal sample. A normal sample is a normal sample that is expected to be the same or similar as reconstructed by the abnormal detecting model. The abnormal sample is expected to be reconstructed via the abnormal detecting model into a result different from the abnormal sample or having a greater difference from the abnormal sample. For example, if the normal sample is the number 7, the reconstructed result of the normal sample via the abnormal detecting model should also be the number 7 or close to 7. And if the abnormal sample is the number 3, the reconstructed result of the abnormal sample via the abnormal detecting model may be different from the number 3.

Figure 4:
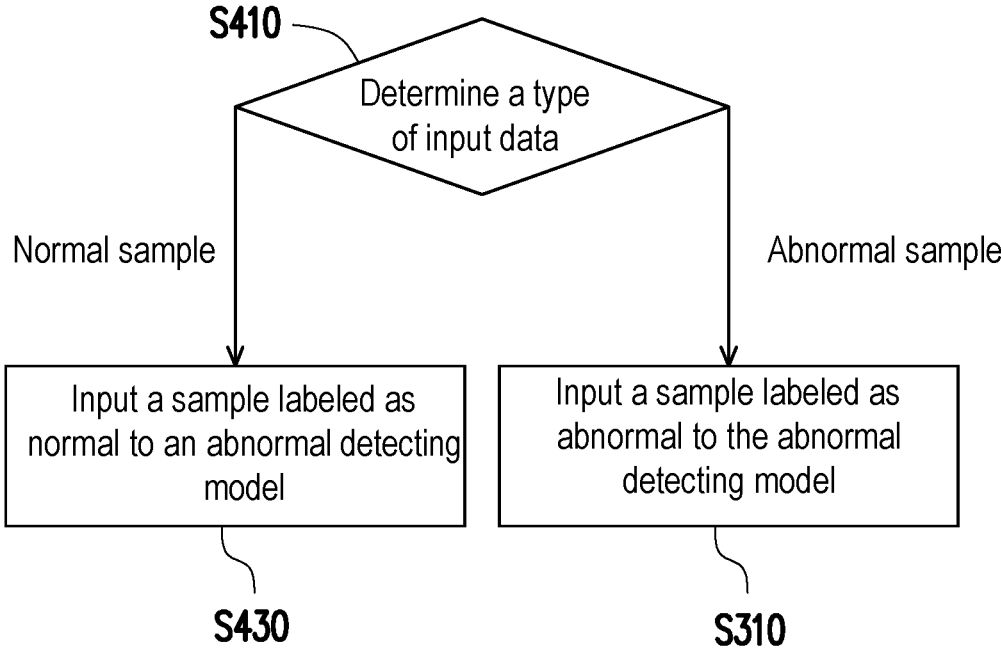
FIG. 4 is a flowchart of type determination according to an embodiment of the disclosure.

FIG. 4 is a flowchart of type determination according to an embodiment of the disclosure. Referring to FIG. 4, in an embodiment, the processor 130 may determine the type of input data (step S410). The input data is, for example, an image or a coded two-dimensional matrix. The category corresponds to one of an abnormal sample and a normal sample. That is, the processor 130 may first determine whether the input data is an abnormal sample or a normal sample. After confirming the category, the processor 130 may input the input data labeled as a normal sample into the abnormal detecting model (step S430) or input the input data labeled as an abnormal sample into the abnormal detecting model (step S310).

In another embodiment, the processor 130 knows the type of the input data. For example, the input data includes or has additional information attached thereto, and this additional information records the category thereof.

The processor 130 may maximize a reconstructed error between the output of the abnormal sample via the abnormal detecting model and the abnormal sample to optimize the abnormal detecting model (step S330). Specifically, in the process of training the newly created abnormal detecting model or optimizing the trained abnormal detecting model, the abnormal detecting model may be further optimized based on the input data. That is, the internal structure and/or parameters (for example, path, weight, or function) of the abnormal detecting model is/are changed. For an abnormal sample, an embodiment of the disclosure is expected to maximize the difference between the reconstructed result (i.e., the output) of the abnormal detecting model and the original input (i.e., the reconstructed error).

In an embodiment, if the input data is labeled as an abnormal sample, the processor 130 may select the first loss function corresponding to the abnormal sample. The first loss function is set such that the predicted error between the target value and the predicted value is greater than the error threshold value. For example, the first loss function is the reciprocal of the predicted error, the difference between the preset value and the absolute value of the predicted error, a sinc function, and so on. The processor 130 may maximize the reconstructed error via the first loss function. For example, the objective function corresponding to the abnormal sample is to maximize the first loss function. That is, the maximum value in the value range of the first loss function is found. The predicted error corresponds to the reconstructed error of the current abnormal sample.

In an embodiment, the processor 130 may directly modify the parameters of the abnormal detecting model or additionally input modified input data to meet the requirement that the reconstructed error is greater than the error threshold value.

In an embodiment, the processor 130 may use the compression performance of the abnormal sample encoded by the encoder of the abnormal detecting model as the target value, and use another compression performance of the reconstructed result of the abnormal detecting model encoded by the encoder as the predicted value, and accordingly decide the predicted error between the target value and the predicted value.

In another embodiment, the processor 130 may use the original abnormal sample input into the abnormal detecting model as the target value, use the reconstructed result of the abnormal detecting model as the predicted value, and determine the corresponding predicted error accordingly.

In an embodiment, the processor 130 may input the labeled normal sample into the abnormal detecting model, and minimize the second reconstructed error between the second output of the normal sample via the abnormal detecting model and the normal sample to optimize the abnormal detecting model. For a normal sample, an embodiment of the disclosure is expected to minimize the difference between the reconstructed result (i.e., the second output) of the abnormal detecting model and the original input (i.e., the second reconstructed error).

In an embodiment, if the input data is a normal sample, the processor 130 may select the second loss function corresponding to the normal sample. The second loss function is set such that the predicted error between the target value and the predicted value is less than the error threshold value. For example, the second loss function is mean-square error (MSE), mean absolute error (MAE), cross entropy, or focus loss. The processor 130 may minimize the reconstructed error via the second loss function. For example, the objective function corresponding to the normal sample is to minimize the second loss function. That is, the minimum value in the value range of the second loss function is found. The predicted error of the second loss function corresponds to the second reconstructed error of the current normal sample.

In an embodiment, the processor 130 may input the input data of the sequence to the abnormal detecting model. The input data of the sequence may include one or more abnormal samples and one or more normal samples, and the arrangement order of the samples thereof is not limited in the embodiments of the disclosure.

In an embodiment, the error threshold value for the first or second loss function may be adjusted based on the recognition or content of the input data. The higher the degree of recognition or the closer the content is to the abnormal or normal sample, the processor 130 may lower the error threshold value.

In order to help readers understand the spirit of the disclosure, another embodiment is described below.

Figure 5:
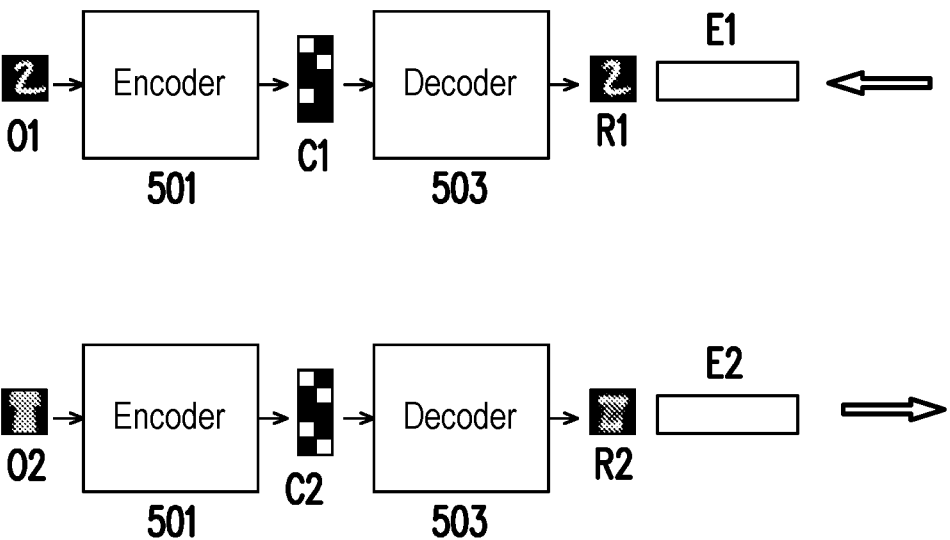
FIG. 5 is a schematic diagram of an autoencoder according to an embodiment of the disclosure.

FIG. 5 is a schematic diagram of an autoencoder according to an embodiment of the disclosure. Referring to FIG. 5, during the model training process of the autoencoder, a normal sample O1 is input into an encoder 501 to obtain a compression performance C1, and the compression performance C1 is input into a decoder 503 to obtain a reconstructed result R1. The processor 130 minimizes a reconstructed error E1 of the normal sample O1 (reducing the value of the reconstructed error E1 as shown by the right arrow thereof).

Moreover, an abnormal sample O2 is input into the encoder 501 to obtain a compression performance C2, and the compression performance C2 is input into the decoder 503 to obtain a reconstructed result R2. The processor 130 maximizes the reconstructed error E2 of the abnormal sample O2 (increasing the value of the reconstructed error E2 as shown by the right arrow thereof).

In an embodiment, the processor 130 may perform abnormal detection, image recognition, lesion detection, or other applications on the subsequent data to be tested using the updated/unupdated abnormal detecting model, and further optimize the abnormal detecting model using the model training method.

Another embodiment of the disclosure provides a non-transitory computer-readable medium recording a computer program loaded into a processor to execute each step of the model training method (the embodiments shown in FIG. 2 to FIG. 5). The computer program may include a plurality of program codes, and after the processor 130 loads and executes the program codes, the model training method may be completed and the function of the model training apparatus 100 may be achieved.

Based on the above, in the model training apparatus, model training method, and computer-readable medium of the embodiments of the disclosure, the reconstructed error of an abnormal sample via the abnormal detecting model is maximized, and the reconstructed error of a normal sample via the abnormal detecting model is minimized. In this way, prediction accuracy may be improved, thereby avoiding misjudgment.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A method of training abnormal detecting model, comprising:

inputting a labeled abnormal sample into an encoder of an abnormal detecting model to obtain a first compression performance, wherein the abnormal detecting model is based on an autoencoder architecture;

inputting the first compression performance into a decoder of the abnormal detecting model to obtain a reconstructed result;

maximizing a reconstructed error between the reconstructed result and the abnormal sample to train the abnormal detecting model, comprising:

inputting the reconstructed result into the encoder of the abnormal detecting model to obtain a second compression performance;

selecting a loss function corresponding to the abnormal sample, wherein the loss function is set such that a predicted error between a target value and a predicted value is greater than an error threshold value, the target value is the first compression performance of the abnormal sample encoded by the encoder of the abnormal detecting model, and to the predicted value is the second compression performance of the reconstructed result encoded by the encoder of the abnormal detecting model; and maximizing the reconstructed error via the loss function, wherein the predicted error corresponds to the reconstructed error.

2. The method of claim 1, further comprising, before the step of inputting the labeled abnormal sample into the abnormal detecting model:

determining a type of input data, wherein the type corresponds to one of the abnormal sample and a normal sample.

3. The method of claim 1, further comprising:

inputting a labeled normal sample into the abnormal detecting model; and minimizing a second reconstructed error between a second output of the normal sample via the abnormal detecting model and the normal sample to optimize the abnormal detecting model.

4. The method of claim 1, further comprising:

performing an abnormal detection on data to be tested using the abnormal detecting model.

5. An apparatus for training abnormal detecting model, comprising:

a storage storing a program code; and a processor coupled to the storage and loading and executing the program code so as to be configured to:

input a labeled abnormal sample into an encoder of an abnormal detecting model to obtain a first compression performance, wherein the abnormal detecting model is based on an autoencoder architecture;

input the first compression performance into a decoder of the abnormal detecting model to obtain a reconstructed result;

maximize a reconstructed error between the reconstructed result and the abnormal sample to train the abnormal detecting model, wherein the processor is further configured to:

input the reconstructed result into the encoder of the abnormal detecting model to obtain a second compression performance;

select a loss function corresponding to the abnormal sample, wherein the loss function is set such that a predicted error between a target value and a predicted value is greater than an error threshold value, the target value is the first compression performance of the abnormal sample encoded by the encoder of the abnormal detecting model, and the predicted value is the second compression performance of the reconstructed result encoded by the encoder of the abnormal detecting model; and maximize the reconstructed error via the loss function, wherein the predicted error corresponds to the reconstructed error.

6. The apparatus of claim 5, wherein the processor is further configured to:

determine a type of input data, wherein the type corresponds to one of the abnormal sample and a normal sample.

7. The apparatus of claim 5, wherein the processor is further configured to:

input a labeled normal sample into the abnormal detecting model; and minimize a second reconstructed error between a second output of the normal sample via the abnormal detecting model and the normal sample to optimize the abnormal detecting model.

8. The apparatus of claim 5, wherein the processor is further configured to:

perform an abnormal detection on data to be tested using the abnormal detecting model.

9. A non-transitory computer-readable medium loading a program code via a processor to train abnormal detecting model, comprising the following steps:

inputting a labeled abnormal sample into an encoder of an abnormal detecting model to obtain a first compression performance, wherein the abnormal detecting model is based on an autoencoder architecture;

inputting the first compression performance into a decoder of the abnormal detecting model to obtain a reconstructed result;

maximizing a reconstructed error between the reconstructed result and the abnormal sample to train the abnormal detecting model, comprising:

inputting the reconstructed result into the encoder of the abnormal detecting model to obtain a second compression performance;

selecting a loss function corresponding to the abnormal sample, wherein the loss function is set such that a predicted error between a target value and a predicted value is greater than an error threshold value, the target value is the first compression performance of the abnormal sample encoded by the encoder of the abnormal detecting model, and the predicted value is the second compression performance of the reconstructed result encoded by the encoder of the abnormal detecting model; and maximizing the reconstructed error via the loss function, wherein the predicted error corresponds to the reconstructed error.

* * * * *